Reissued Apr. 14, 1931

Re. 18,048

UNITED STATES PATENT OFFICE

WALTER G. HANSEN, OF BUTTE, MONTANA

PROCESS OF MANUFACTURING ANIMAL FOODS

No Drawing. Original No. 1,777,795, dated October 7, 1930, Serial No. 329,669, filed December 31, 1928. Application for reissue filed January 30, 1931. Serial No. 512,482.

This invention relates to the manufacture of an animal food and has for its object to provide a food which will be highly nutritious, economical to manufacture and pleasing in appearance.

Another object of the invention is to produce an animal food upon which neither extreme heat or cold have any injurious effect and which may be kept for years without deterioration. Another object of the invention is to produce a food that may be sliced or minced, the food being in a solid or semi-solid mass as a result of my method of producing same.

With these and other objects in view which will be developed as the specification proceeds I will now describe my invention in the preferred form with the understanding that variations may be made without departing from the spirit of the invention.

My animal food which is particularly adapted as a dog food is made principally from meat, flour, broken rice or whole wheat with a trace of garlic mixed with water.

The proportions being ordinarily about as follows:

76# red horse meat, 4# horse fat—80# meat. (Net weight after being boiled for twenty minutes.)

15# ground barley.

5# broken rice or 5# whole wheat.

Trace garlic.

I add to these materials about 10½ gallons stock or soup in which the meat has been previously boiled.

An important feature of the invention is to produce a solid or semi-solid mass in a can and still use the usual commercial can filling machinery. A further object is to produce a food in the form of a meat loaf in a can, which food has the properties of being servable as a whole, sliced or minced.

The meat is first drawn by boiling the same about twenty minutes, then drained. This produces a uniform amount of moisture in the meat to be used. As the raw meat varies in moisture content this step is essential for a uniform product. The meat is then ground or triturated and mixed with a ground cereal, usually corn flour for a binder. This step in the operation assures cohesion of the finished product. A sufficient quantity of the meat liquor is then added to reduce the whole to such a consistency as will permit of it being forced through the usual commercial can fillers.

This consistency if unchanged would produce a product in the can of a water nature. It is therefore of prime importance that almost immediately before the introduction of the product into the can a proper amount of whole, milled or cracked rice or barley or both be added.

After the can is sealed the dry rice or barley absorbs the liquors and in so doing increases their own volume which causes the whole to result in a solid or semi-solid mass. After the mass is put in cans I preferably pass them through an exhaust box for about five minutes at about 180° Fahrenheit then pass them through a retort for two hours at about 240° Fahrenheit after which the cans are cooled with running cold water.

In accordance with my process I am able to produce a meat loaf in a can which insures its keeping and upon which neither extreme heat or cold have any injurious effect and permits me to guarantee the product to keep for many years and which may be served in slices or minced.

What I claim and desire to secure by Letters Patent is:

1. A process for the manufacture of animal food consisting in boiling in water red horse meat and horse fat, draining off the water, grinding the meat and mixing it with cereal to insure cohesion of the finished product, then adding a sufficient quantity of the withdrawn meat liquor to reduce the whole to a consistency that will permit of it being forced through a commercial can filler then adding a cracked cereal and immediately introducing the product into a can and sealing the can.

2. The process of making a dog food which comprises boiling in water a mixture of red meat and fat, draining the meat and triturating it, then mixing the meat with flour to act as a binder, adding a sufficient quantity of fluid to reduce the whole to a consistency that will permit it to be forced through a can filler, then adding cracked cereal that will absorb the excess fluid and expand, and before the expansion of the cereal takes place inserting the mass in a can and sealing the can.

3. A process for manufacturing animal food consisting in boiling portions of red meat and fat, grinding the meat and adding a sufficient quantity of liquid to reduce the whole to a consistency that will permit of its being forced through a commercial can filler, adding enough cracked cereal to form a semi-solid product and introducing the product into a can before the cereal has time to completely absorb the liquid and sealing the can.

4. A process for manufacturing animal food consisting in grinding meat and adding thereto a sufficient quantity of liquid to impart to the whole mass a condition of fluidity, mixing cracked cereal with the fluid mass to absorb the moisture therein to form a semi-solid product, and introducing the mixture into a container before the mass sets through the absorption of the moisture content by the cracked cereal.

5. A process of manufacturing animal food consisting in boiling meat in water to provide a uniform moisture content throughout the meat, grinding the boiled meat and adding thereto a sufficient quantity of liquid to impart to the whole mass a condition of fluidity, mixing enough cracked cereal with the fluid mass to absorb the moisture therein to form a semi-solid product, and introducing the mixture into a container before the mass sets through the absorption of the moisture content by the cracked cereal.

WALTER G. HANSEN.